(12) United States Patent
Murano (10) Patent No.: US 11,353,414 B2
(45) Date of Patent: Jun. 7, 2022

(54) ANALYSIS DEVICE AND SPECTRUM GENERATION METHOD

(71) Applicant: JEOL Ltd., Tokyo (JP)

(72) Inventor: Takanori Murano, Tokyo (JP)

(73) Assignee: JEOL Ltd., Tokyo (JP)

( * ) Notice: Subject to any disclaimer, the term of this patent is extended or adjusted under 35 U.S.C. 154(b) by 33 days.

(21) Appl. No.: 16/810,133

(22) Filed: Mar. 5, 2020

(65) Prior Publication Data

US 2020/0284739 A1    Sep. 10, 2020

(30) Foreign Application Priority Data

Mar. 8, 2019 (JP) .............................. JP2019-042640

(51) Int. Cl.
*G01N 23/2252* (2018.01)
*G01N 23/2209* (2018.01)
*G01N 23/207* (2018.01)

(52) U.S. Cl.
CPC ..... *G01N 23/2252* (2013.01); *G01N 23/2076* (2013.01); *G01N 23/2209* (2018.02); *G01N 2223/076* (2013.01); *G01N 2223/079* (2013.01)

(58) Field of Classification Search
None
See application file for complete search history.

(56) References Cited

U.S. PATENT DOCUMENTS

| 5,166,755 A * | 11/1992 | Gat | G01J 3/02 |
|---|---|---|---|
| | | | 250/226 |
| 8,155,267 B2 * | 4/2012 | Hodeau | G21K 1/06 |
| | | | 378/44 |
| 9,417,341 B2 * | 8/2016 | Erko | G21K 1/067 |
| 10,948,436 B2 * | 3/2021 | Kato | G01N 23/223 |
| 11,131,638 B2 * | 9/2021 | Murano | G01N 23/2209 |

(Continued)

FOREIGN PATENT DOCUMENTS

| JP | 2005274270 A | 10/2005 |
|---|---|---|
| JP | 2010160094 A | 7/2010 |

(Continued)

OTHER PUBLICATIONS

Extended European Search Report issued in EP20161623.2 dated Jun. 4, 2020.

(Continued)

*Primary Examiner* — Thomas R Artman
(74) *Attorney, Agent, or Firm* — The Webb Law Firm (57) ABSTRACT

An analysis device includes a spectroscopic element that diffracts a signal generated by a specimen, a detector that detects the signal diffracted by the spectroscopic element, and a spectrum generation unit that generates a spectrum of the signal based on a detection result by the detector, the detector including detection regions arranged in a plurality of rows and a plurality of columns, a divergent direction of the signal incident on the detector being neither parallel nor perpendicular to a column direction of the detector, and the spectrum generation unit performing: processing for acquiring a plurality of row spectra by generating a row spectrum for each of the plurality of rows based on detection signals relating to the detection regions arranged in a row direction; and processing for generating a spectrum of the signal based on the plurality of row spectra.

5 Claims, 6 Drawing Sheets

(56) References Cited

U.S. PATENT DOCUMENTS

| | | | | |
|---|---|---|---|---|
| 2010/0135457 | A1* | 6/2010 | Hodeau | G01N 23/2076 |
| | | | | 378/44 |
| 2014/0314207 | A1* | 10/2014 | Erko | G21K 1/067 |
| | | | | 378/82 |
| 2019/0227008 | A1* | 7/2019 | Kato | G01N 23/223 |
| 2020/0191733 | A1* | 6/2020 | Murano | G01N 23/20008 |
| 2020/0284739 | A1* | 9/2020 | Murano | G01N 23/20091 |
| 2021/0302339 | A1* | 9/2021 | Murano | G01N 23/2252 |

FOREIGN PATENT DOCUMENTS

| | | | | |
|---|---|---|---|---|
| JP | 201258146 A | | 3/2012 | |
| WO | WO-2014068689 A1 * | | 5/2014 | H01J 37/244 |

OTHER PUBLICATIONS

Pagano et al., "Technology Development in Support of Hyperspectral Infrared Atmospheric Sounding in a CubeSat", Proceedings of SPIE vol. 10769, pp. 1-14 2018.
Office Action issued in JP2019042640 dated Mar. 16, 2021.

* cited by examiner

ANALYSIS DEVICE AND SPECTRUM GENERATION METHOD

CROSS-REFERENCE TO RELATED APPLICATION

This application claims priority to Japanese Patent Application No. 2019-042640 filed Mar. 8, 2019, the disclosure of which is hereby incorporated by reference in its entirety.

BACKGROUND OF THE INVENTION

Field of the Invention

The present invention relates to an analysis device and a spectrum generation method.

Description of Related Art

In a known method of performing element analysis, a specimen is irradiated with a primary beam such as an electron beam or an X-ray, and X-rays emitted from the specimen are detected.

Energy-dispersive X-ray spectrometry, in which composition information about a specimen is acquired by irradiating the specimen with an electron beam in an electron microscope and detecting X-rays emitted from the specimen, is an example thereof. Energy-dispersive X-ray spectrometry uses the fact that characteristic X-rays have energy values that are unique to the elements constituting the specimen. On a spectrum of characteristic X-rays acquired by energy-dispersive X-ray spectrometry, element types contained in the specimen are determined from the energy values of the peaks, and the content of each element type is determined from the surface area of the corresponding peak.

Further, a method using a soft x-ray emission spectrometer (SXES), in which a diffraction grating is combined with a charge-coupled device (CCD) image sensor, is known as another example of the method described above. For example, in an analysis device disclosed in JP-A-2012-58146, a specimen is irradiated with an electron beam, soft X-rays generated from the specimen are focused by a mirror and diffracted by the diffraction grating, the diffracted soft X-rays are received by the X-ray CCD image sensor, and thus a spectrum is acquired.

In the analysis device described above, the interval between adjacent points on the spectrum is determined by the pixel pitch of the CCD image sensor. Therefore, when the pixel pitch of the CCD image sensor is large relative to the energy resolution (wavelength resolution) of the X-rays in a spectroscopic element such as the diffraction grating, even assuming that the X-rays can be subjected to energy dispersion by the spectroscopic element at a high resolution, it may be impossible to reproduce the spectrum accurately.

SUMMARY OF THE INVENTION

According to a first aspect of the invention, there is provided an analysis device including:
a spectroscopic element that diffracts a signal generated by a specimen;
a detector that detects the signal diffracted by the spectroscopic element; and
a spectrum generation unit that generates a spectrum of the signal based on a detection result by the detector,
the detector including detection regions arranged in a plurality of rows and a plurality of columns,
a divergent direction of the signal incident on the detector being neither parallel nor perpendicular to a column direction of the detector, and
the spectrum generation unit performing:
processing for acquiring a plurality of row spectra by generating a row spectrum for each of the plurality of rows based on detection signals relating to the detection regions arranged in a row direction of the detector; and
processing for generating a spectrum of the signal based on the plurality of row spectra.

According to a second aspect of the invention, there is provided a spectrum generation method executed in an analysis device including a spectroscopic element that diffracts a signal generated by a specimen, and a detector in which detection regions used to detect the signal diffracted by the spectroscopic element are arranged in a plurality of rows and a plurality of columns,
the spectrum generation method comprising:
acquiring a plurality of row spectra by generating a row spectrum for each of the plurality of rows based on detection signals relating to the detection regions arranged in a row direction of the detector; and
generating a spectrum of the signal based on the plurality of row spectra,
a divergent direction of the signal incident on the detector being neither parallel nor perpendicular to a column direction of the detector.

DESCRIPTION OF THE INVENTION (1) According to an embodiment of the invention, there is provided an analysis device including:
a spectroscopic element that diffracts a signal generated by a specimen;
a detector that detects the signal diffracted by the spectroscopic element; and
a spectrum generation unit that generates a spectrum of the signal based on a detection result by the detector,
the detector including detection regions arranged in a plurality of rows and a plurality of columns, a divergent direction of the signal incident on the detector being neither parallel nor perpendicular to a column direction of the detector, and the spectrum generation unit performing:

processing for acquiring a plurality of row spectra by generating a row spectrum for each of the plurality of rows based on detection signals relating to the detection regions arranged in a row direction of the detector; and processing for generating a spectrum of the signal based on the plurality of row spectra.

With this analysis device, the interval between adjacent points on the spectrum can be reduced in comparison with a case where the divergent direction of the signal and the column direction of the detector are parallel, for example, and as a result, the resolution of the spectrum can be improved.

(2) According to an embodiment of the invention, there is provided a spectrum generation method executed in an analysis device including a spectroscopic element that diffracts a signal generated by a specimen, and a detector in which detection regions used to detect the signal diffracted by the spectroscopic element are arranged in a plurality of rows and a plurality of columns, the spectrum generation method comprising:

acquiring a plurality of row spectra by generating a row spectrum for each of the plurality of rows based on detection signals relating to the detection regions arranged in a row direction of the detector; and generating a spectrum of the signal based on the plurality of row spectra, a divergent direction of the signal incident on the detector being neither parallel nor perpendicular to a column direction of the detector.

With this spectrum generation method, the interval between adjacent points on the spectrum can be reduced in comparison with a case where the divergent direction of the signal is parallel to the column direction of the detector, for example, and as a result, the resolution of the spectrum can be improved.

Embodiments of the invention are described in detail below with reference to the drawings. Note that the following embodiments do not unduly limit the scope of the invention as stated in the claims. In addition, all of the elements described below are not necessarily essential requirements of the invention.

1. ANALYSIS DEVICE

Figure 1:
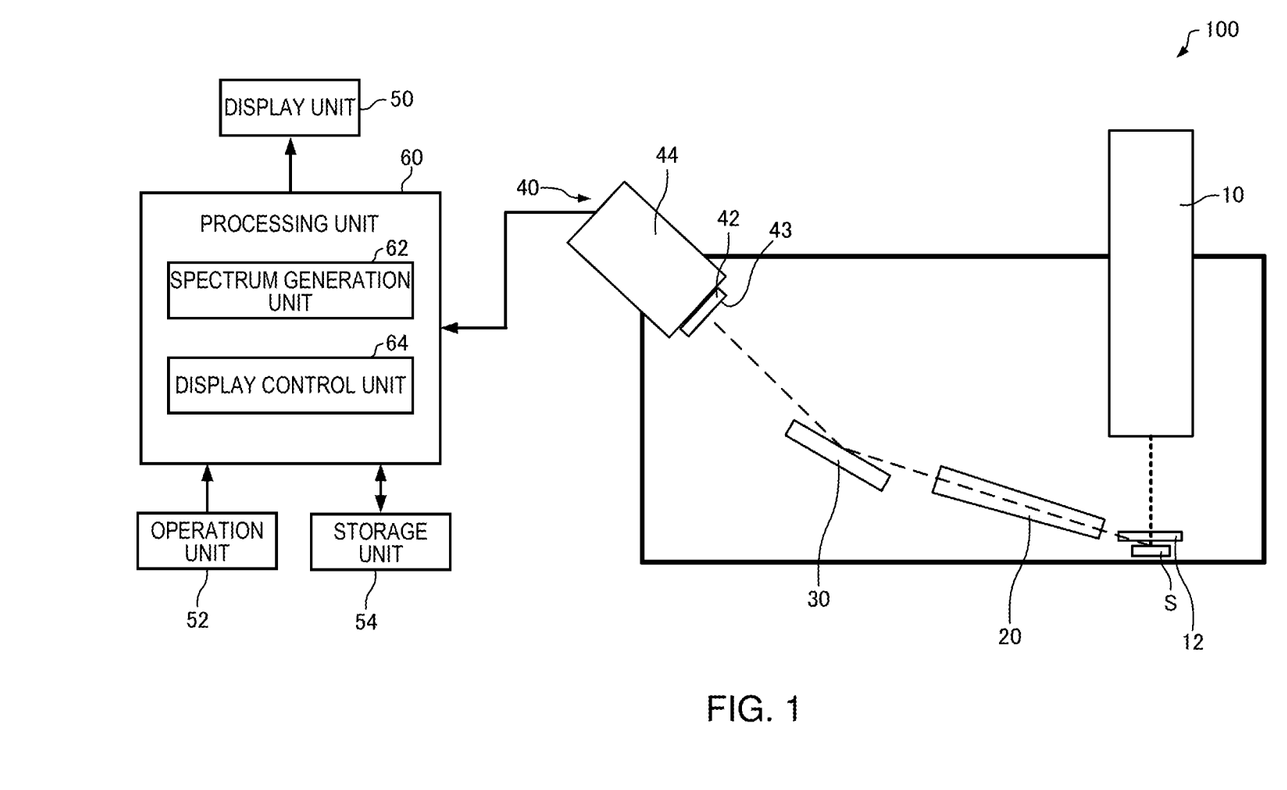
FIG. 1 is a diagram illustrating the configuration of an analysis device according to an embodiment of the invention.

First, an analysis device according to an embodiment of the invention will be described with reference to the figures. FIG. 1 is a diagram illustrating the configuration of an analysis device 100 according to an embodiment of the invention.

As illustrated in FIG. 1, the analysis device 100 includes an electron beam emitting unit 10, an X-ray focusing mirror 20, a diffraction grating 30, an X-ray detection device 40, a display unit 50, an operating unit 52, a storage unit 54, and a processing unit 60.

The electron beam emitting unit 10 irradiates a specimen S with an electron beam. The electron beam emitting unit 10 includes an electron gun serving as an electron beam source, and an illumination-lens system for irradiating the specimen S with the electron beam emitted from the electron gun. The analysis device 100 may also function as a scanning electron microscope for acquiring a scanning electron microscope image (a SEM image).

In the analysis device 100, an electrostatic deflection plate 12 is disposed above the specimen S. When the specimen S is irradiated with the electron beam, characteristic soft X-rays (also referred to simply as "X-rays" hereafter) are generated from the specimen S. In addition to the X-rays, backscattered electrons, secondary electrons, and so on are also generated from the specimen S. By disposing the electrostatic deflection plate 12, the backscattered electrons, secondary electrons, and so on can be removed. Moreover, the potential applied to the electrostatic deflection plate 12 is variable, and by applying the potential in accordance with the accelerating voltage of the electron beam, background can be reduced.

The X-ray focusing mirror 20 focuses the X-rays emitted from the specimen S and guides the focused X-rays to the diffraction grating 30. By focusing the X-rays using the X-ray focusing mirror 20, the intensity of the X-rays entering the diffraction grating 30 can be increased. As a result, the measurement time can be reduced, and the S/N ratio of the spectrum can be improved.

The X-ray focusing mirror 20 is constituted by two mutually opposing mirrors, for example. The interval between the two mirrors is narrow on the specimen S side (the entrance side) and wide on the diffraction grating 30 side (the exit side). Thus, the dose of X-ray entering the diffraction grating 30 can be increased.

The diffraction grating 30 diffracts the X-rays that are generated by the specimen S when the specimen S is irradiated with the electron beam. When the X-rays enter the diffraction grating 30 at a specific angle, X-rays (diffracted X-rays) diffracted into respective energies (wavelengths) can be acquired. The diffraction grating 30 is an unequal interval diffraction grating, for example, in which grooves are formed at unequal intervals for the purpose of aberration correction. The diffraction grating 30 is configured such that when X-rays enter at a large entrance angle, the focus of the diffracted X-rays is formed on a detection plane 43 of an image sensor 42 rather than on the Rowland circle.

The X-ray detection device 40 is configured to include the image sensor 42 (an example of a detector) and a control device 44.

The image sensor 42 detects the X-rays (diffracted X-rays) diffracted by the diffraction grating 30. The image sensor 42 is highly sensitive to soft X-rays. The image sensor 42 is a charge-coupled device (CCD) image sensor, a complementary MOS (CMOS) image sensor, or the like, for example. The image sensor 42 is a back-illuminated CCD image sensor, for example. The image sensor 42 is positioned so that the detection plane 43 is aligned with an image plane of the diffracted X-rays.

Figure 2:
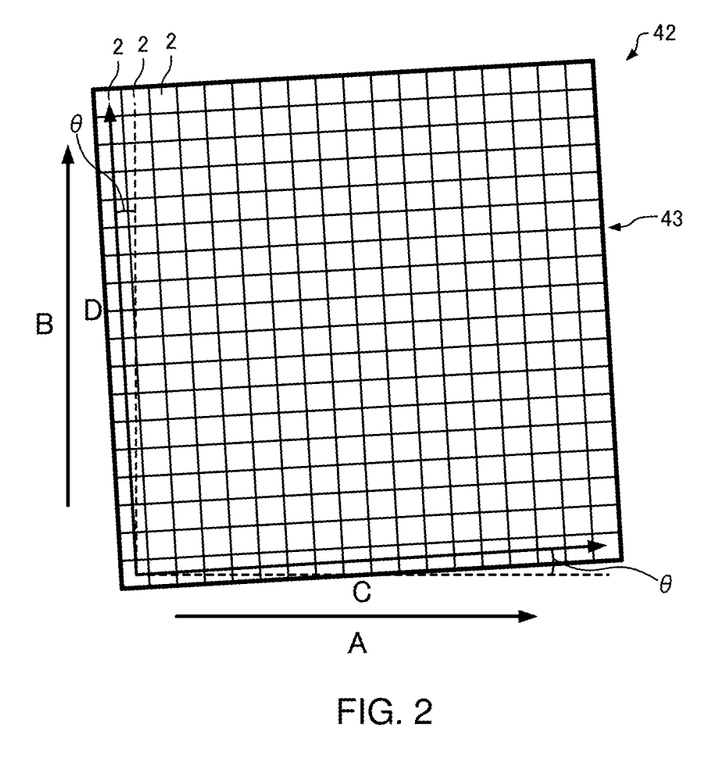
FIG. 2 is a plan view schematically illustrating a detection plane of an image sensor.

FIG. 2 is a plan view schematically illustrating the detection plane 43 of the image sensor 42.

As illustrated in FIG. 2, the image sensor 42 includes detection regions 2 arranged in a plurality of rows and a plurality of columns. On a detection plane 43, the detection regions 2 are arranged in a row direction C and a column direction D. The row direction C and the column direction D are orthogonal to each other. The row direction C is the direction in which the rows extend, and the column direction D is the direction in which the columns extend.

Hereafter, the number of detection regions 2 arranged in the row direction C will be set as M (where M is an integer of 2 or more), and the number of detection regions 2 arranged in the column direction D will be set as N (where N is an integer of 2 or more). In other words, the image sensor 42 includes M×N detection regions 2. The number M of detection regions 2 arranged in the row direction C and the number N of detection regions 2 arranged in the column direction D may be the same or different.

Each detection region 2 corresponds to one pixel of a CCD image sensor, for example. Note that each detection region 2 may also be constituted by a plurality of adjacent pixels of the image sensor 42 (binning). The M×N detection regions 2 are each capable of independently detecting an X-ray diffracted by the diffraction grating 30. The M×N detection regions 2 each output a detection signal. The detection signal includes information indicating the intensity of the X-ray detected in the detection region 2.

On the detection plane 43 of the image sensor 42, an energy dispersion direction A of the X-ray is a direction in which an X-ray incident on the detection plane 43 of the image sensor 42 disperses energy. Further, a divergent direction B of the X-ray is a direction in which an X-ray incident on the detection plane 43 of the image sensor 42 diffuses (a spreading direction). In the example illustrated in the figure, the energy dispersion direction A and the divergent direction B are orthogonal to each other.

The energy dispersion direction A is neither parallel nor perpendicular to the row direction C. Similarly, the divergent direction B is neither parallel nor perpendicular to the column direction D. An angle θ formed by the divergent direction B of the X-ray and the column direction D satisfies the relationship of the following formula, for example.

$$\theta = \tan^{-1}(1/N)$$

where $0° < \theta < 90°$.

The control device 44 controls the image sensor 42 illustrated in FIG. 1. The control device 44 supplies power to the image sensor 42. Further, the control device 44 executes processing for transmitting an output signal from the image sensor 42 to the processing unit 60. The control device 44 includes a cooling mechanism for cooling the image sensor 42 and thereby controls the temperature of the image sensor 42.

The display unit 50 outputs an image generated by the processing unit 60. The display unit 50 can be realized by a display such as a liquid crystal display (LCD), for example.

The operating unit 52 executes processing for converting instructions from a user into signals and transmitting the signals to the processing unit 60. The operating unit 52 can be realized by an input device such as buttons, keys, a touch panel display, or a microphone, for example.

The storage unit 54 stores programs and data used by the processing unit 60 in various calculation processing and various control processing. The storage unit 54 is also used as a work area of the processing unit 60. The storage unit 54 can be realized by a random access memory (RAM), a read only memory (ROM), a hard disk, and so on, for example.

The processing unit 60 performs processing for generating an X-ray spectrum based on the X-ray detection result acquired by the image sensor 42. Further, the processing unit 60 executes control for displaying the generated spectrum on the display unit 50. The functions of the processing unit 60 can be realized by executing a program using various processors (a central processing unit (CPU) or the like). The processing unit 60 includes a spectrum generation unit 62 and a display control unit 64.

The spectrum generation unit 62 generates an X-ray spectrum based on X-ray detection result acquired by the image sensor 42. The spectrum generation unit 62 performs processing for generating a spectrum (also referred to hereafter as a "row spectrum") for each row based on the detection signals relating to the detection regions 2 arranged in the row direction C, thereby generating a plurality of row spectra, and processing for generating an X-ray spectrum based on the plurality of row spectra. The processing performed by the spectrum generation unit 62 will be described in detail below.

The display control unit 64 executes control for displaying the spectrum generated by the spectrum generation unit 62 on the display unit 50.

2. SPECTRUM GENERATION METHOD

Next, a method employed in the analysis device 100 to generate an X-ray spectrum will be described. More specifically, first, a spectrum generation method employed in an analysis device according to a reference example will be described. Next, the spectrum generation method employed in the analysis device 100 will be described by comparing the method of the analysis device according to the reference example with the method of the analysis device 100.

Figure 3:
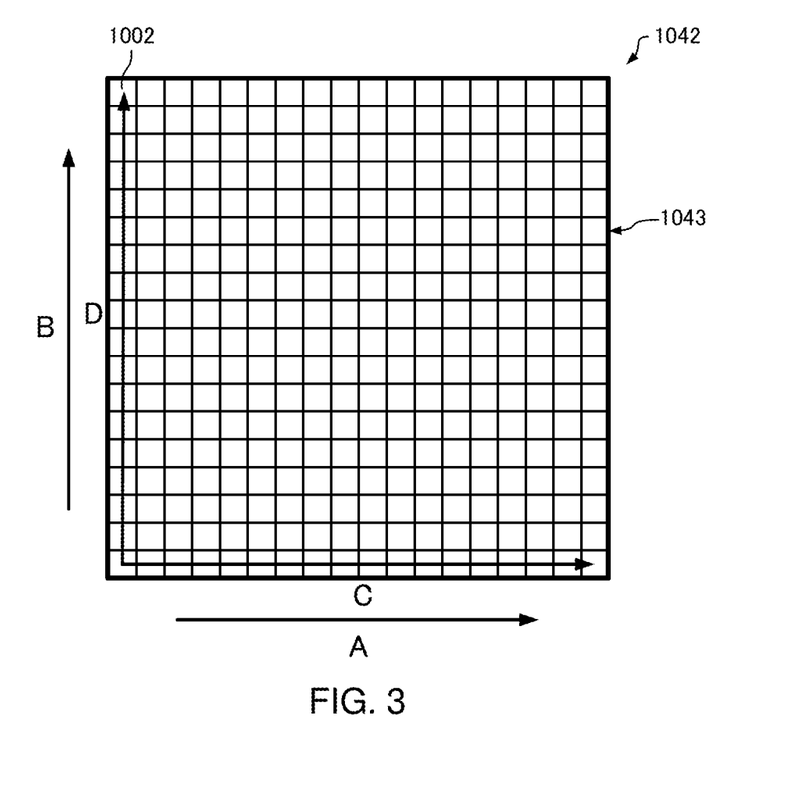
FIG. 3 is a plan view schematically illustrating the detection plane of an image sensor of an analysis device according to a reference example.

FIG. 3 is a plan view schematically illustrating a detection plane 1043 of an image sensor 1042 of the analysis device according to the reference example. Here, a case in which the image sensor 1042 is a CCD image sensor having 2048×2048 pixels will be described. In other words, in the image sensor 1042, 2048 detection regions 1002 are arranged in the row direction C, and 2048 detection regions 1002 are arranged in the column direction D.

As illustrated in FIG. 3, in the image sensor 1042, the energy dispersion direction A is parallel to the row direction C, and the divergent direction B is parallel to the column direction D.

Figure 4:
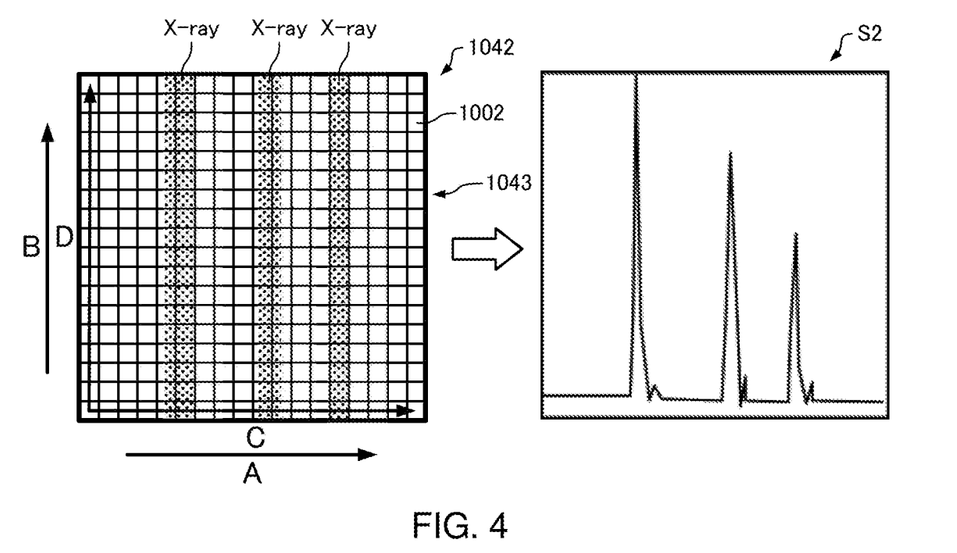
FIG. 4 is a diagram illustrating a spectrum generation method employed in the analysis device according to the reference example.

FIG. 4 is a diagram illustrating the spectrum generation method employed in the analysis device according to the reference example.

In the analysis device according to the reference example, as illustrated in FIG. 4, an X-ray spectrum S2 is generated by integrating the intensities of the X-rays detected by the plurality of detection regions 1002 arranged in the column direction D.

In the analysis device according to the reference example, the column direction D is parallel to the divergent direction B of the X-ray, and therefore X-rays having the same energy (wavelength) are detected in the 2048 detection regions 1002 arranged in the same direction. Hence, the spectrum S2 is generated by integrating the intensities of the X-rays detected by the 2048 detection regions 1002 arranged in the column direction D.

On the spectrum S2, the horizontal axis expresses the energy (wavelength) of the X-ray. The energy of the X-ray corresponds to the position in the row direction C of the detection regions 2. Further, on the spectrum S2, the vertical axis expresses the intensity of the X-ray. Thus, the spectrum S2 is represented by an energy axis that expresses the energy (wavelength) of the X-ray and is set as a horizontal axis, and an intensity axis that expresses the intensity of the X-ray and is set as a vertical axis. The number of points constituting the spectrum S2 matches the number of detection regions 1002 arranged in the row direction C. Hence, the number of points constituting the spectrum S2 is 2048.

Figure 5:
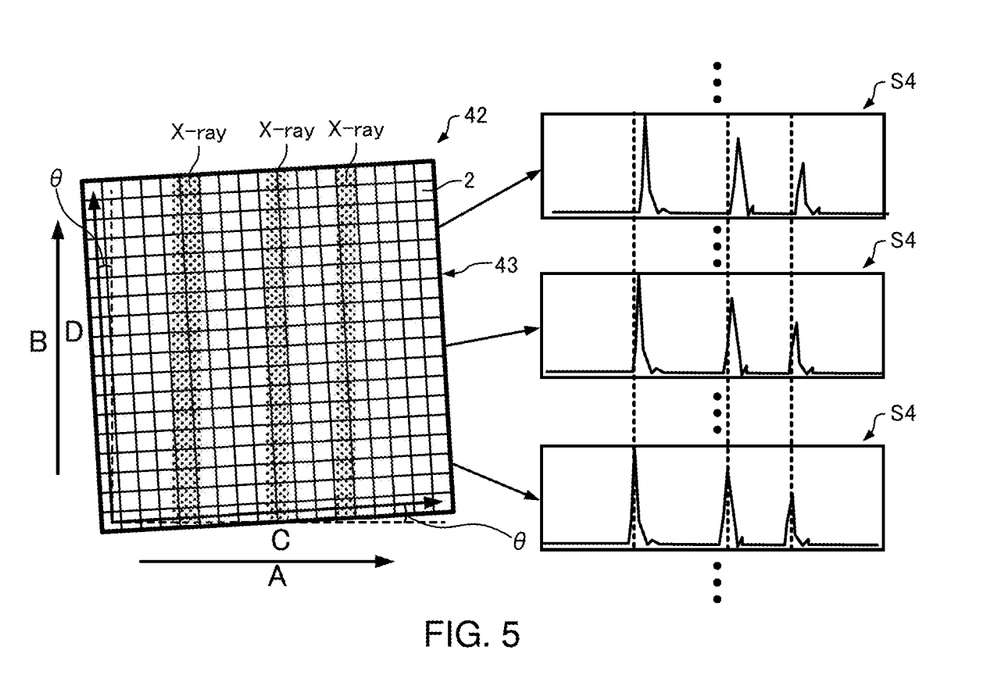
FIG. 5 is a diagram illustrating a spectrum generation method employed in the analysis device according to an embodiment of the invention.

FIG. 5 is a diagram illustrating the spectrum generation method employed in the analysis device 100. Differences with the analysis device according to the reference example will be described below, while description of similarities will be omitted.

As illustrated in FIG. 5, in the analysis device 100, the detection plane 43 of the image sensor 42 is acquired by rotating the image sensor 1042 illustrated in FIG. 4 by the angle θ. Accordingly, the angle formed by the divergent direction B of the X-ray and the column direction D is the angle θ.

In the analysis device 100, similarly to the analysis device according to the reference example, illustrated in FIG. 3, 2048 detection regions 2 are arranged in the row direction C and 2048 detection regions 2 are arranged in the column direction D. In other words, the number M of detection regions 2 arranged in the row direction C=2048 and the number N of detection regions 2 arranged in the column direction D=2048. Hence, the angle θ is $\theta=\tan^{-1}(1/2048)$.

In the analysis device 100, a row spectrum S4 is generated for each row so that 2048 row spectra S4 are acquired. For example, first, on the first row, the row spectrum S4 of the first row is generated based on the intensities of the X-rays detected by the 2048 detection regions 2 arranged in the row direction C. Next, on the second row, the row spectrum S4 of the second row is generated based on the intensities of the X-rays detected by the 2048 detection regions 2 arranged in the row direction C. Similar processing is then performed from the third row onward. By repeating the processing for generating the row spectrum S4 from the first to the 2048$^{th}$ row in this manner, 2048 row spectra S4 are acquired.

Figure 6:
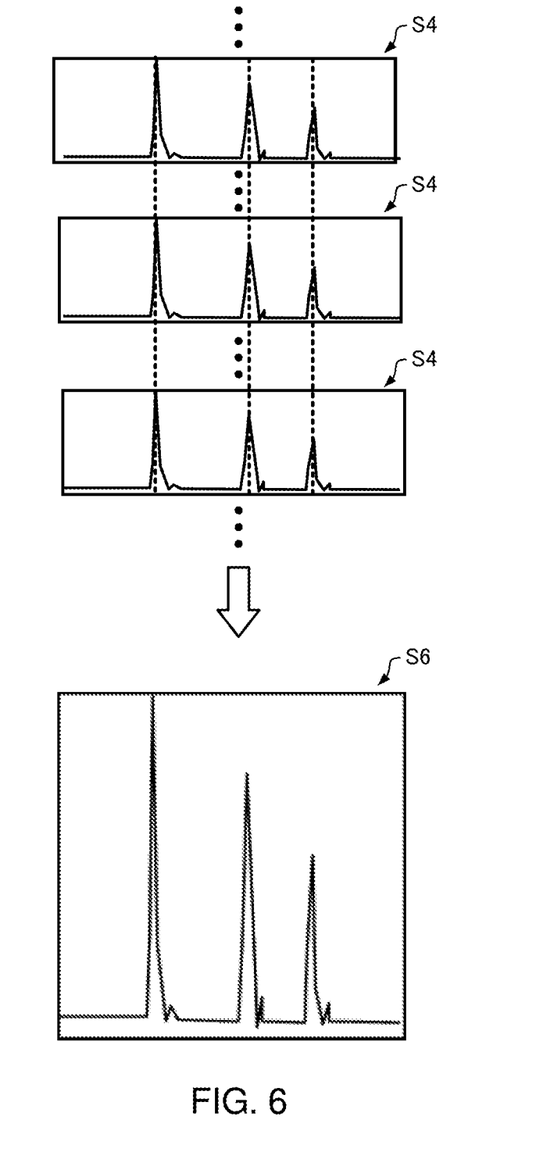
FIG. 6 is a diagram illustrating processing for correcting the energy axes of row spectra.

FIG. 6 is a diagram illustrating processing for correcting the energy axes of the row spectra S4.

The energy axes, i.e. the horizontal axes, of the 2048 row spectra S4 deviate from each other. Therefore, the energy axes of the row spectra S4 are corrected based on peaks of the row spectra S4. More specifically, as illustrated in FIG. 6, the energy axis of each row spectrum S4 is corrected so that positions of corresponding peaks on the 2048 row spectra S4 have identical energy values.

Next, the 2048 row spectra S4 having the corrected energy axes are formed into a single spectrum. For example, the points constituting the respective row spectra S4 of the 2048 row spectra S4 are plotted on a single graph. In so doing, a spectrum S6 can be generated.

The spectrum S6 illustrated in FIG. 6 is constituted by 2048×2048 points, and the interval between adjacent points is 1/2048 that of the spectrum S2 illustrated in FIG. 4. In other words, the resolution of the energy axis of the spectrum S6 is 2048 times greater than the resolution of the energy axis of the spectrum S2.

Cases in which one detection region 1002 and one detection region 2 each form one pixel of the CCD image sensor were described above, but the above description applies likewise to a case in which the pixels constituting the CCD image sensor are binned.

For example, when 128×128 pixels form a single detection region 2, the interval between adjacent points on the spectrum S6 generated by the analysis device 100 is 1/16 that of the spectrum S2 generated by the analysis device according to the reference example. In other words, the resolution of the energy axis of the spectrum S6 is 16 times greater than the resolution of the energy axis of the spectrum S2.

3. PROCESSING

Figure 7:
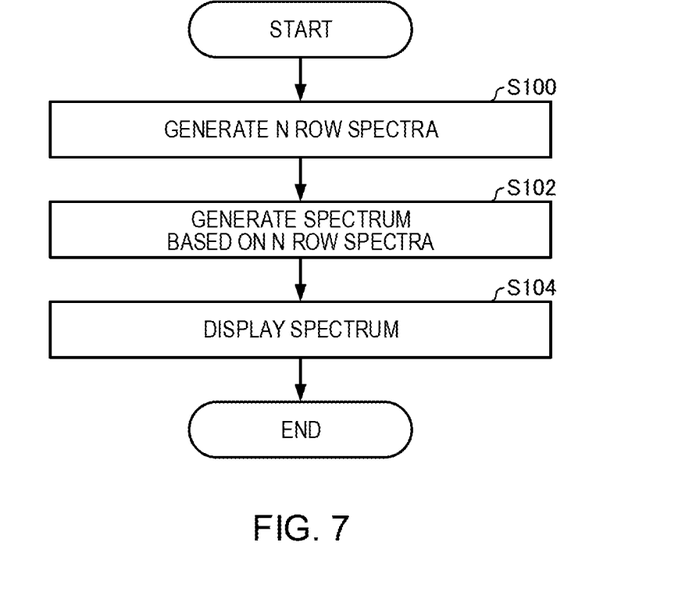
FIG. 7 is a flowchart illustrating an example of processing executed by a processing unit of the analysis device according to an embodiment of the invention.

Next, the processing executed by the processing unit 60 of the analysis device 100 will be described. FIG. 7 is a flowchart illustrating an example of the processing executed by the processing unit 60 of the analysis device 100.

In the analysis device 100, when the specimen S is irradiated with an electron beam by the electron beam emitting unit 10, X-rays are generated from the specimen S. The X-rays generated from the specimen S are focused by the X-ray focusing mirror 20 and then enter the diffraction grating 30. The X-rays entering the diffraction grating 30 exit at exit angles corresponding to the energies (wavelengths) thereof and then enter the detection plane 43 of the image sensor 42. The X-rays incident on the detection plane 43 are detected by the M×N detection regions 2. Each of the M×N detection regions 2 outputs a detection signal. The detection signals output respectively from the M×N detection regions 2 are transmitted to the processing unit 60.

The spectrum generation unit 62 generates N row spectra S4 by generating a row spectrum S4 for each row based on the detection signals from the M detection regions 2 arranged in the row direction C (S100).

Next, the spectrum generation unit 62 generates the spectrum S6 based on the N row spectra S4 (S102).

In the processing for generating the spectrum S6, first, the energy axes of the N row spectra S4 are corrected based on the respective peaks of the N row spectra S4. More specifically, the energy axis of each row spectrum S4 is corrected so that positions of corresponding peaks on the N row spectra S4 have identical energy values.

Next, the spectrum generation unit 62 generates the spectrum S6 based on the N row spectra S4 having the corrected energy axes. For example, the points constituting the respective row spectra S4 of the N row spectra S4 are plotted on a single graph. In so doing, the spectrum S6 can be generated.

Next, the display control unit 64 executes control for displaying the spectrum generated by the spectrum generation unit 62 on the display unit 50 (S104). As a result, the spectrum S6 is displayed on the display unit 50.

4. ACTIONS AND EFFECTS

The analysis device 100 exhibits the following actions and effects, for example.

In the analysis device 100, the image sensor 42 includes the detection regions 2 arranged in a plurality of rows and a plurality of columns, and the divergent direction B of an X-ray incident on the image sensor 42 is neither parallel nor perpendicular to the column direction D. Further, the spectrum generation unit 62 performs processing for acquiring the plurality of row spectra S4 by generating the row spectrum S4 for each row based on the detection signals relating to the detection regions 2 arranged in the row direction C, and processing for generating the spectrum S6 based on the plurality of row spectra S4. With the analysis device 100, therefore, the interval between adjacent points on the spectrum can be reduced in comparison with a case where the divergent direction B of the X-ray is parallel to the column direction D, for example, and as a result, the resolution of the spectrum can be improved.

Further, with the analysis device 100, the resolution of the spectrum can be improved, and therefore effective filter processing can be executed on the spectrum. When the number of points constituting the peaks of the spectrum is small, for example, filter processing using a low-pass filter or the like cannot be performed effectively.

In the analysis device 100, when N denotes the number of detection regions 2 arranged in the column direction D, the angle θ formed by the divergent direction B of the X-ray and the column direction D is $\theta=\tan^{-1}(1/N)$. With the analysis device 100, therefore, the interval between adjacent points can be set at 1/N compared to that of a case in which the divergent direction B of the X-ray is parallel to the column direction D, for example. In other words, the resolution of the energy axis of the spectrum can be set at a multiple of N.

In the analysis device 100, the energy axes of the plurality of row spectra S4 are corrected based on the respective peaks of the plurality of row spectra S4, and the spectrum S6 is generated based on the plurality of row spectra S4 having the corrected energy axes. With the analysis device 100, therefore, the resolution of the spectrum S6 can be improved.

Furthermore, even if the angle formed by the divergent direction B of the X-ray and the column direction D deviates, for example, the energy axes of the plurality of row spectra S4 are corrected based on the respective peaks of the plurality of row spectra S4, and therefore the deviation in the angle can be corrected.

The spectrum generation method employed in the analysis device 100 has the following features, for example.

The spectrum generation method employed in the analysis device 100 includes the steps of acquiring the plurality of row spectra S4 by generating the row spectrum S4 for each row based on the detection signals relating to the detection regions 2 arranged in the row direction C, and generating the spectrum S6 based on the plurality of row spectra S4. Further, the image sensor 42 includes the detection regions 2 arranged in a plurality of rows and a plurality of columns, and the divergent direction B of an X-ray incident on the image sensor 42 is neither parallel nor perpendicular to the column direction D of the image sensor 42. Hence, in comparison with a case where the divergent direction B of the X-ray is parallel to the column direction D, for example, the interval between adjacent points on the spectrum can be reduced, and as a result, the resolution of the spectrum can be improved.

5. MODIFIED EXAMPLES

5.1. First Modified Example

In the analysis device 100 described above, a case in which the angle θ formed by the divergent direction B of the X-ray and the column direction D satisfies $\theta = \tan^{-1}(1/N)$ was described, but as long as the divergent direction B of the X-ray is neither parallel nor perpendicular to the column direction D, there are no particular limitations on the angle θ.

5.2. Second Modified Example

Figure 8:
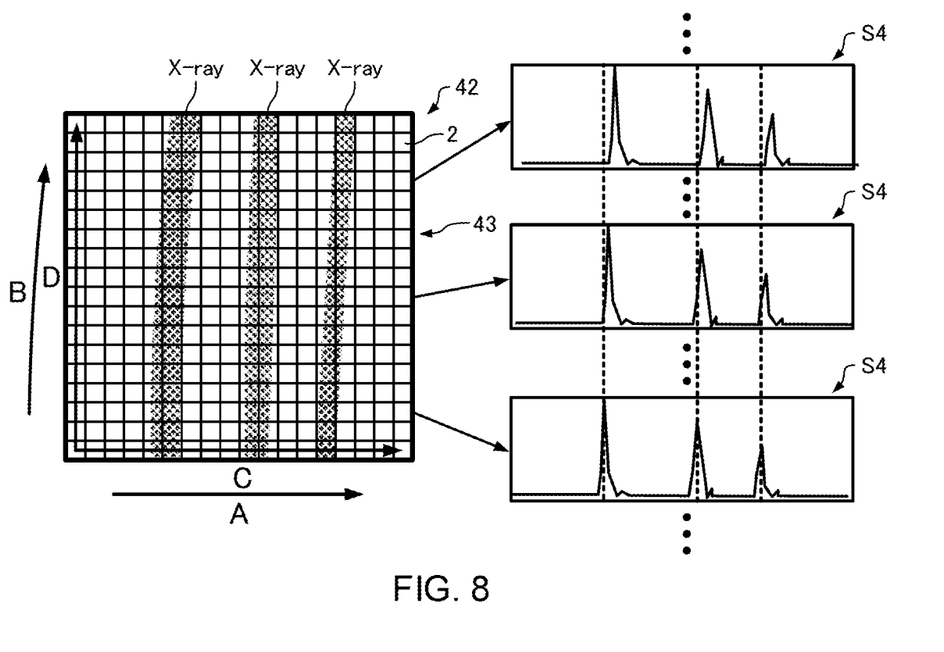
FIG. 8 is a diagram illustrating a spectrum generation method employed in an analysis device according to a second modified example.

FIG. 8 is a diagram illustrating a spectrum generation method employed in an analysis device according to a second modified example. Differences with the example of the above analysis device 100 will be described below, while description of similarities will be omitted.

In the analysis device 100 according to the above embodiment, the detection plane 43 of the image sensor 42 is rotated so that the divergent direction B of the X-ray is neither parallel nor perpendicular to the column direction D.

In the second modified example, meanwhile, as illustrated in FIG. 8, the divergent direction B of the X-ray and the column direction D are set to be neither parallel nor perpendicular by bending the X-rays diffracted by the diffraction grating 30 (see FIG. 1).

For example, when the diffraction grating 30 is an irregular interval diffraction grating, in which grooves are formed at irregular intervals for the purpose of aberration correction, the divergent direction B of the diffracted X-rays can be bent. In so doing, the divergent direction B and the column direction D can be set so as to be neither parallel nor perpendicular in a similar manner to a case in which the detection plane 43 of the image sensor 42 is rotated.

Hence, with the analysis device according to the second modified example, similar actions and effects to those of the analysis device 100 described above can be achieved.

Note that the invention is not limited to the embodiments described above, and various modifications may be applied within the scope of the invention.

For example, in the embodiments described above, as illustrated in FIG. 1, the X-rays generated by the specimen S are diffracted by the diffraction grating 30, but the spectroscopic element that diffracts the X-rays generated by the specimen S is not limited thereto, and a spectroscopic element capable of continuous energy dispersion of the X-rays may be used instead. A zone plate or the like, for example, may be cited as this type of spectroscopic element.

Further, in the embodiments described above, the specimen S is irradiated with an electron beam, but X-rays may be generated from the specimen S by irradiating the specimen S with a primary beam other than an electron beam. An X-ray beam, an ultraviolet beam, or the like may be cited as other types of primary beams.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An analysis device comprising:
    a spectroscopic element that diffracts a signal generated by a specimen;
    a detector that detects the signal diffracted by the spectroscopic element; and
    a spectrum generation unit that generates a spectrum of the signal based on a detection result by the detector,
    the detector including detection regions arranged in a plurality of rows and a plurality of columns,
    a divergent direction of the signal incident on the detector being neither parallel nor perpendicular to a column direction of the detector, and
    the spectrum generation unit performing:
        processing for acquiring a plurality of row spectra by generating a row spectrum for each of the plurality of rows based on detection signals relating to the detection regions arranged in a row direction of the detector; and
        processing for generating a spectrum of the signal based on the plurality of row spectra, wherein energy axes of the plurality of row spectra are corrected so that positions of corresponding peaks on the plurality of row spectra have identical energy values, and wherein the spectrum of the signal is generated by plotting a plurality of points constituting the plurality of row spectra having the corrected energy axes on a single graph.

2. The analysis device according to claim 1, wherein, an angle $\theta$ formed by the divergent direction and the column direction is $\theta=\tan^{-1}(1/N)$, where N denotes the number of the detection regions arranged in the column direction.

3. The analysis device according to claim 1, wherein the signal is an X-ray.

4. A spectrum generation method executed in an analysis device including a spectroscopic element that diffracts a signal generated by a specimen, and a detector in which detection regions used to detect the signal diffracted by the spectroscopic element are arranged in a plurality of rows and a plurality of columns, the spectrum generation method comprising:
acquiring a plurality of row spectra by generating a row spectrum for each of the plurality of rows based on detection signals relating to the detection regions arranged in a row direction of the detector; and
generating a spectrum of the signal based on the plurality of row spectra, wherein a divergent direction of the signal incident on the detector is neither parallel nor perpendicular to a column direction of the detector, wherein energy axes of the plurality of row spectra are corrected so that positions of corresponding peaks on the plurality of row spectra have identical energy values, and wherein the spectrum of the signal is generated by plotting points constituting the plurality of row spectra having the corrected energy axes on a single graph.

5. The spectrum generation method according to claim 4, wherein an angle $\theta$ formed by the divergent direction and the column direction is $\theta=\tan^{-1}(1/N)$, where N denotes the number of the detection regions arranged in the column direction.

* * * * *